(12) United States Patent
Judge

(10) Patent No.: US 6,763,751 B2
(45) Date of Patent: *Jul. 20, 2004

(54) CORDLESS CHOP SAW

(75) Inventor: Albert H. Judge, Jarrettsville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/256,910

(22) Filed: Sep. 27, 2002

(65) Prior Publication Data

US 2003/0047051 A1 Mar. 13, 2003

Related U.S. Application Data

(63) Continuation of application No. 09/134,135, filed on Aug. 14, 1998.
(60) Provisional application No. 60/060,148, filed on Sep. 26, 1997.

(51) Int. Cl.[7] ................................................. B27B 5/18
(52) U.S. Cl. ....................... 83/471.3; 83/581; 83/468.1; 83/468.3; 83/486.1
(58) Field of Search ............................... 83/471.3, 581, 83/468.1, 468.3, 486.1, 485, 490

(56) References Cited

U.S. PATENT DOCUMENTS

| | | | | |
|---|---|---|---|---|
| 1,607,197 A | * | 11/1926 | Hatleli | 30/377 |
| 4,384,502 A | * | 5/1983 | Dover | 83/471.3 |
| 4,413,414 A | * | 11/1983 | Strzalka | 30/380 |
| 4,589,208 A | * | 5/1986 | Iwasaki et al. | 30/376 |
| 5,146,825 A | * | 9/1992 | Dehari | 83/397 |
| 5,207,141 A | * | 5/1993 | Dehari | 83/471.3 |
| 5,239,758 A | * | 8/1993 | Lindell | 30/500 |
| 5,241,888 A | * | 9/1993 | Chen | 83/471.3 |
| 5,287,786 A | * | 2/1994 | Fiala | 83/863 |
| 5,664,612 A | * | 9/1997 | Klemma | 144/286.1 |
| 5,699,705 A | * | 12/1997 | Sibbet | 83/13 |
| 5,755,148 A | * | 5/1998 | Stumpf et al. | 83/468.2 |
| 5,819,624 A | * | 10/1998 | Brault et al. | 83/471.3 |
| 5,862,732 A | * | 1/1999 | Itzov | 83/471.3 |
| 6,523,447 B2 | * | 2/2003 | Judge | 83/471.3 |

OTHER PUBLICATIONS

Felisatti catalog and price listing, dated 1/96, submitted by applicant in Ser. No. 09/134,135, part No. T777B.*

* cited by examiner

Primary Examiner—M. Rachuba
(74) Attorney, Agent, or Firm—Adan Ayala

(57) ABSTRACT

A chop saw including a base, a rotatable table rotatably disposed on said base, and a saw unit pivotably connected to the table. The saw unit includes a blade, a motor for driving the blade, and a housing for covering the motor. The saw unit is movable downwardly towards the table in order to cuttingly engage a workpiece. In addition, the chop saw includes a battery connected to said motor. Preferably, the battery is attached to the housing.

21 Claims, 6 Drawing Sheets

CORDLESS CHOP SAW

This application is a Continuation of application Ser. No. 09/134,135 filed on Aug. 14, 1998 which claims benefit of Provisional application No. 60/060,148 filed Sep. 26, 1997.

FIELD OF THE INVENTION

This invention relates generally to chop saws and, more particularly, to a cordless chop saw.

BACKGROUND OF THE INVENTION

Chop saws are used in jobsites for cutting wood planks, wood boards, moldings, metal bars, etc. Accordingly, chop saws typically have high power requirements in order to cut the work pieces. Thus, chop saws have been typically connected to a gas-powered generator or to the jobsite's electrical wiring.

There are times, however, when none of these options are available. In such circumstances, users have not been able to use their chop saws until someone brought a gas generator, etc. This would mean delays in construction schedules, etc., which raise labor and building costs, lowering the profit of a contractor or builder. Accordingly, it is an object of the present application to provide a chop saw that resolves the prior art problems.

SUMMARY OF THE INVENTION

In accordance with the present invention, an improved chop saw is employed. The chop saw includes a base, a rotatable table rotatably disposed on said base, and a saw unit pivotably connected to the table. The saw unit including a blade, a motor for driving the blade, and a housing for covering the motor. The saw unit is movable downwardly towards the table in order to cuttingly engage a workpiece. In addition, the chop saw includes a battery connected to said motor. Preferably, the battery is attached to the housing.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
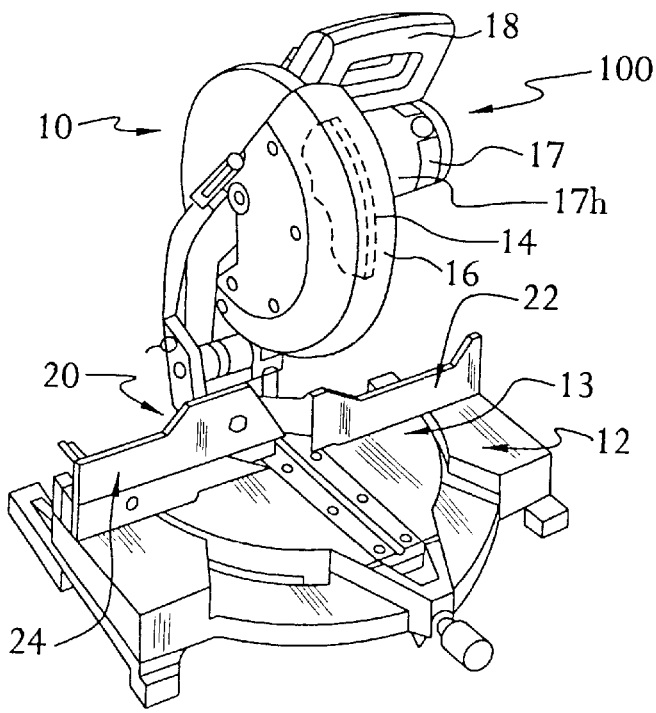
FIG. 1 is a front perspective view of an exemplary chop saw according to the present invention.
Figure 2:
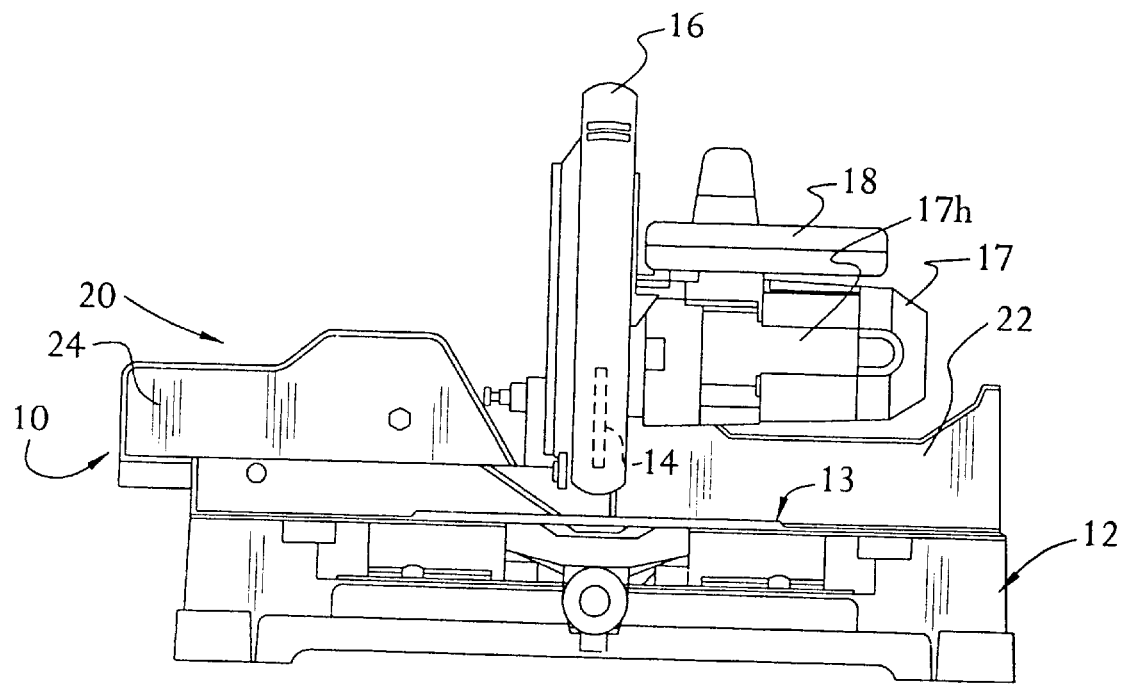
FIG. 2 is a front elevational view of the chop saw of FIG. 1.

The invention is now described with reference to the accompanying figures, wherein like numerals designate like parts. FIGS. 1 through 4 illustrate an exemplary chop saw, which can be mitered. One skilled in the art will readily recognize from the following description that the principles of the invention are equally applicable to compound miter saws, sliding miter saws, non-mitering chop saws, etc.

The exemplary chop saw 10 according to the present invention typically includes a base 12, including a table 13, which is preferably rotatable about an axis perpendicular to the top surface plane of table 13. The saw 10 also includes a saw unit 100 pivotably attached to the table 13. The saw unit comprises a saw blade 14, at least partially enclosed by a blade guard 16 and driven by a motor 17, and a handle 18, which allows the operator to move the saw blade 14 and the blade guard 16 from a clear position free of a workpiece (not shown) to a downward cutting position with the saw blade 14 in cutting engagement with a workpiece (not shown). The motor 17 is covered by a housing 17h.

As shown in FIGS. 1–4, the blade 14 is perpendicular to the plane including the top surface of the table 13. Persons skilled in the art will recognize that the saw unit 100 can also be pivotably attached to the table 13 so that the angle of the blade 14 relative to the top surface plane, i.e., the bevel angle of the blade 14, can be changed.

As is conventional in this type of equipment, a fence assembly, indicated generally by reference numeral 20, is interconnected with the base 12 and extends laterally across the table 13, against which the workpiece (not shown) is fixedly positioned and supported for performing a cutting operation thereon. As shown in FIGS. 1–4, the fence assembly 20 includes a fixed fence portion 22 and a movable fence portion 24, respectively, extending in a mutually aligned lateral direction, with the movable fence portion 24 being laterally spaced away from the fixed fence portion 22. Such lateral spacing or gap between the fixed and movable fence portions 22 and 24, respectively provides clearance for the saw blade to perform a cutting operation completely through the workpiece, regardless of the mode or type of cutting operation being performed. Accordingly, a user can laterally move the movable fence portion 24 toward and away from the fixed fence portion 22 in order to selectively adjust the clearance gap therebetween and thus accommodate the particular cutting operation being performed. For further information on the fence assembly 20, persons skilled in the art are directed to U.S. Pat. No. 5,297,463, assigned to Black & Decker Inc., which is incorporated herein by reference.

Figure 3:
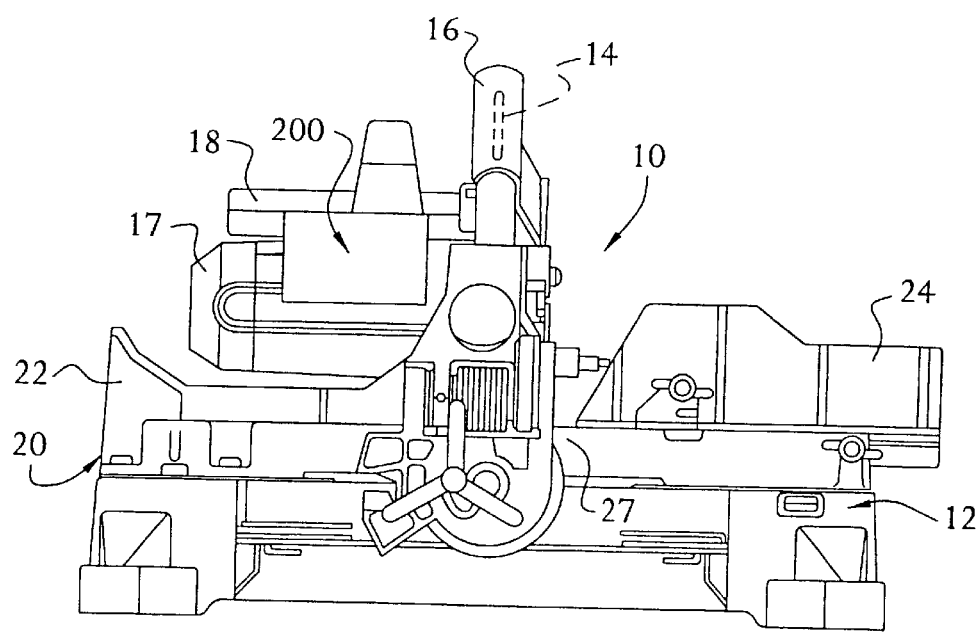
FIG. 3 is a rear elevational view of the chop saw of FIG. 1.
Figure 4:
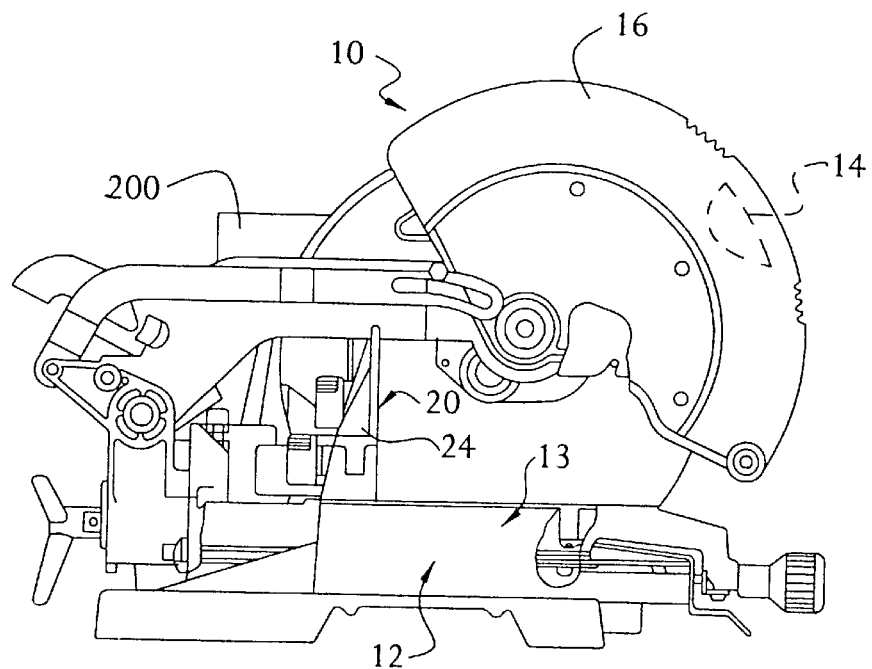
FIG. 4 is a left end elevational view of the chop saw of FIG. 1.

The chop saw 10 also has a battery 200 connected to the motor 17. The battery 200 may be mounted on housing 17h, as shown in FIGS. 3 and 4, preferably in a manner that does not interfere with the chopping action of the saw unit 100. The battery 200 is preferably a rechargeable nickel cadmium (NiCd), nickel metal hydride (NiMH), lithium, or lead-acid battery. Such batteries can support the high-current, high-power requirements needed for a cordless chop saw. Preferably, such batteries have a voltage rating of at least 14 volts.

Figure 5:
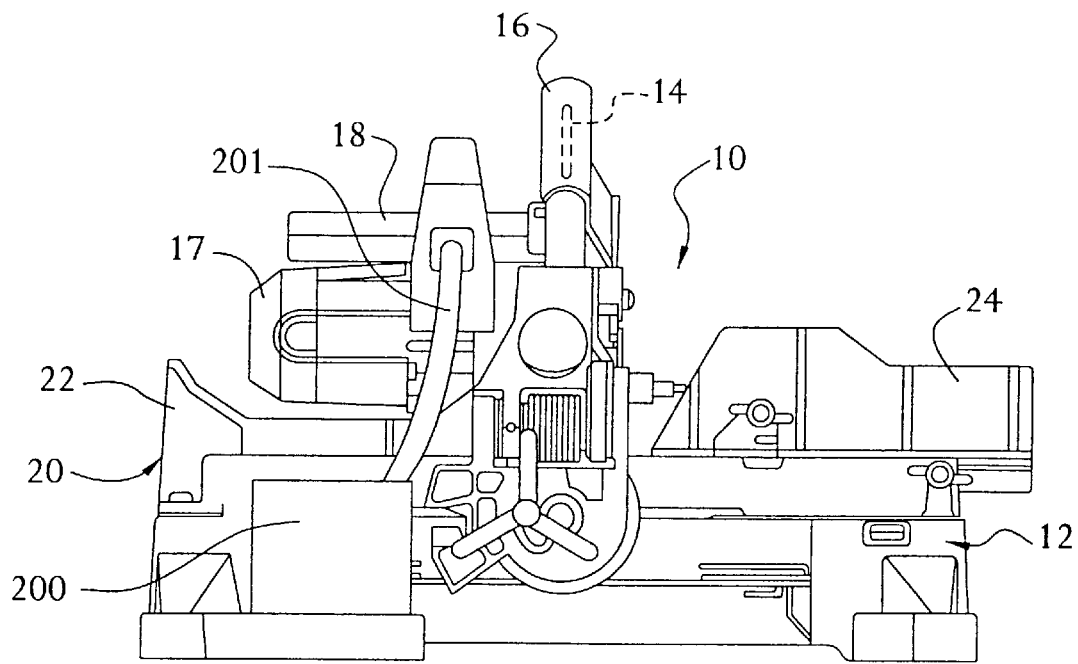
FIG. 5 is a rear elevational view of a second embodiment of a chop saw according to the present invention.
Figure 6:
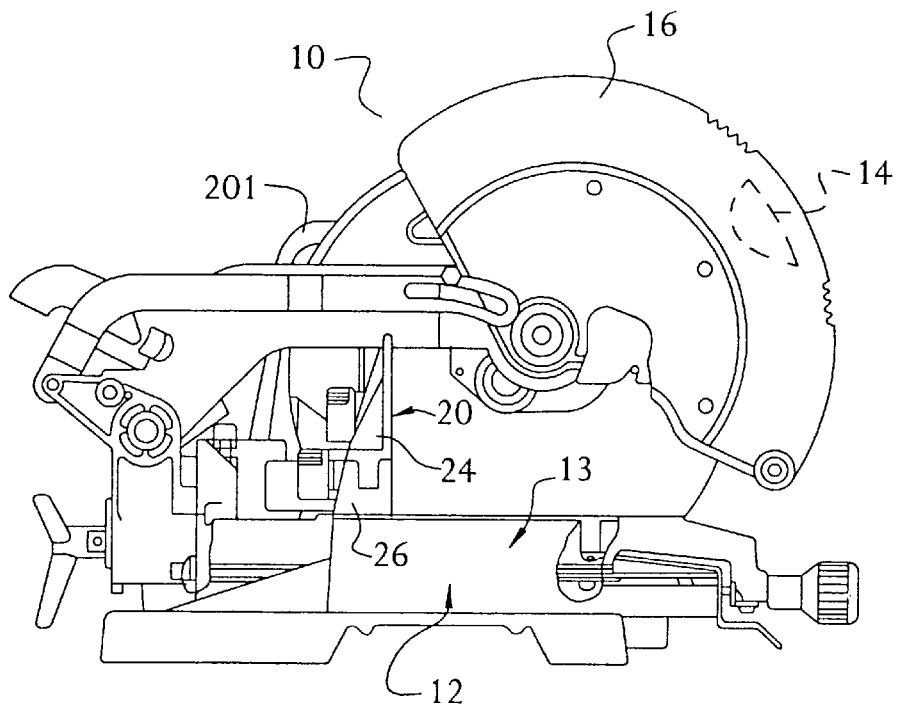
FIG. 6 is a left end elevational view of the chop saw of FIG. 5.

Persons skilled in the art will also recognize that the battery 200 may also be installed on the base 12 of the chop saw 10, decreasing the weight of the saw unit 100 and facilitating the chopping action. As shown in FIGS. 5 and 6, the battery 200 can be connected to the motor 17 via a cable 201.

Figure 7:
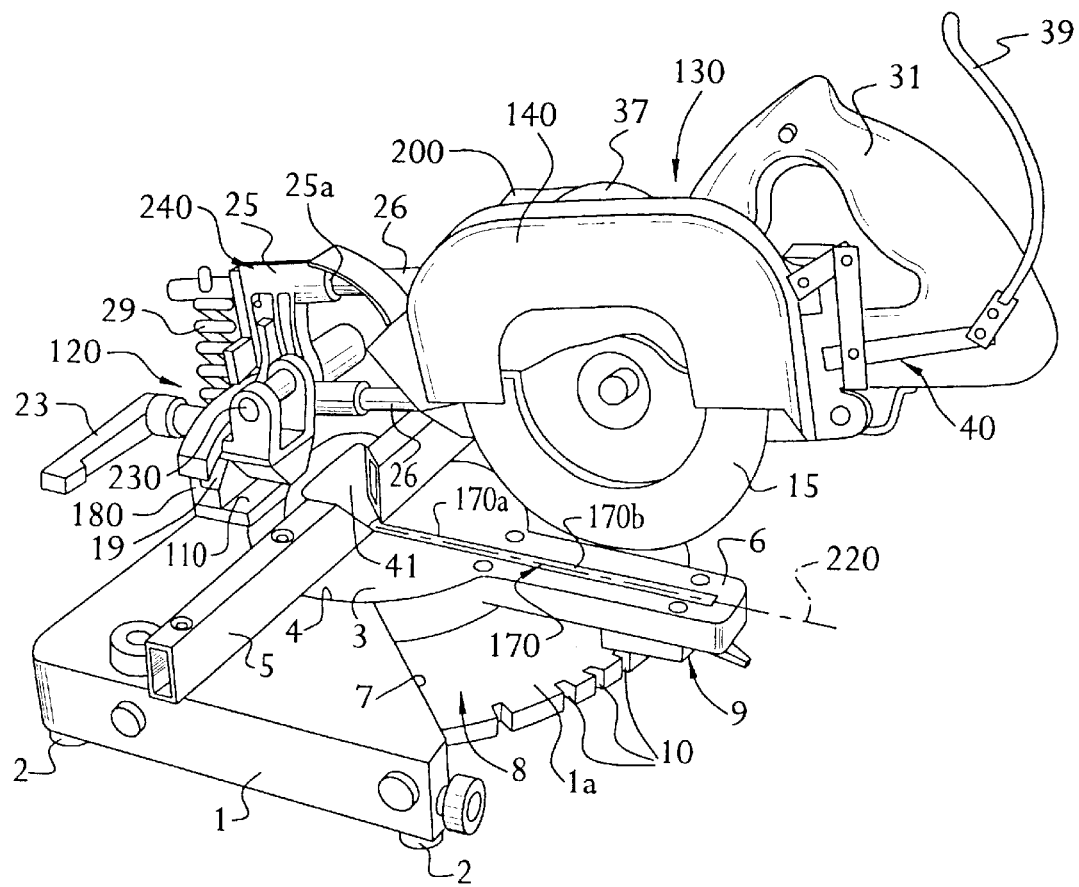
FIG. 7 is a front perspective view of a third embodiment of a chop saw according to the present invention.
Figure 8:
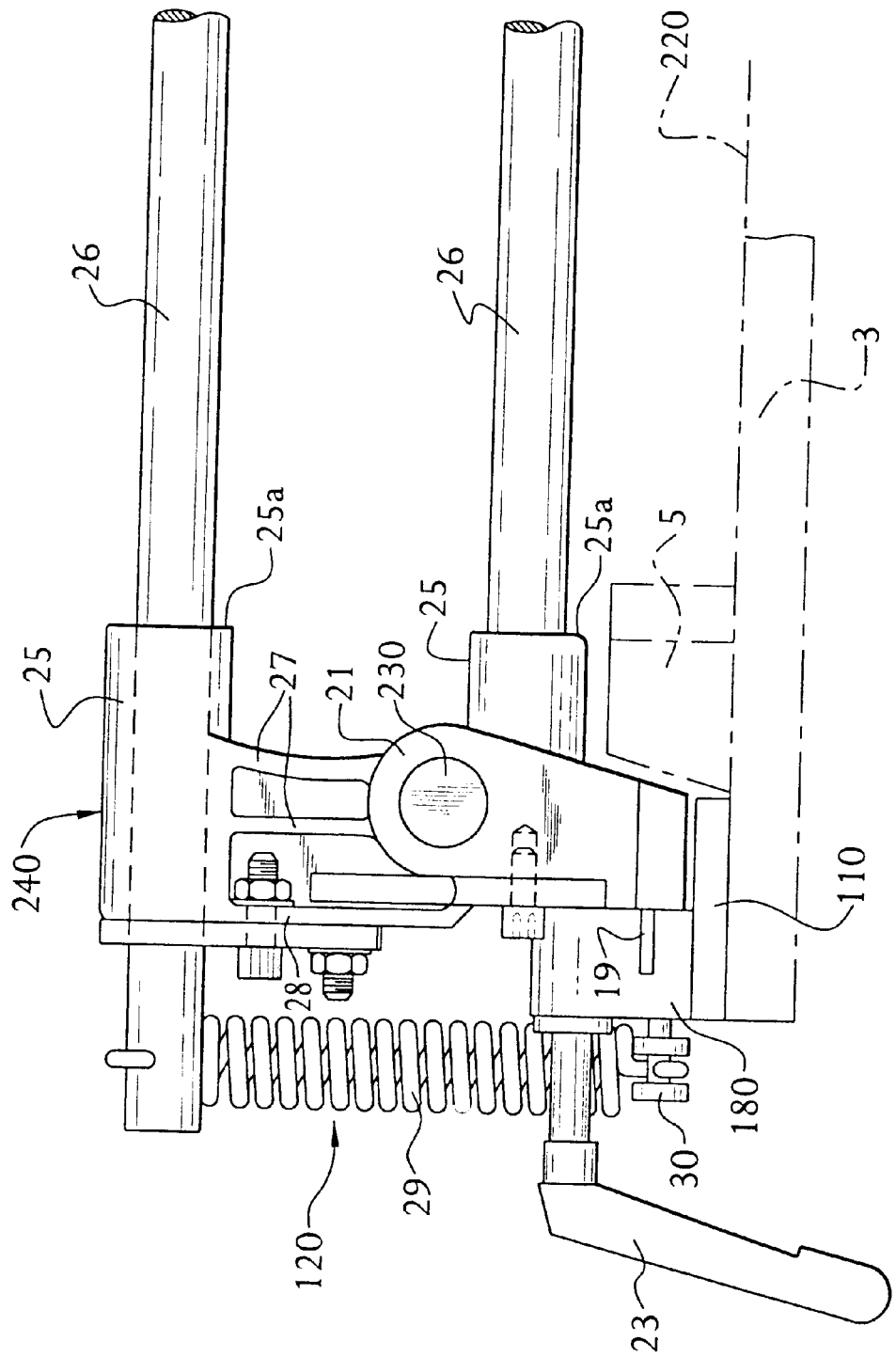
FIG. 8 is a side elevational view of a pivot bearing for the saw of FIG. 7.
Figure 9:
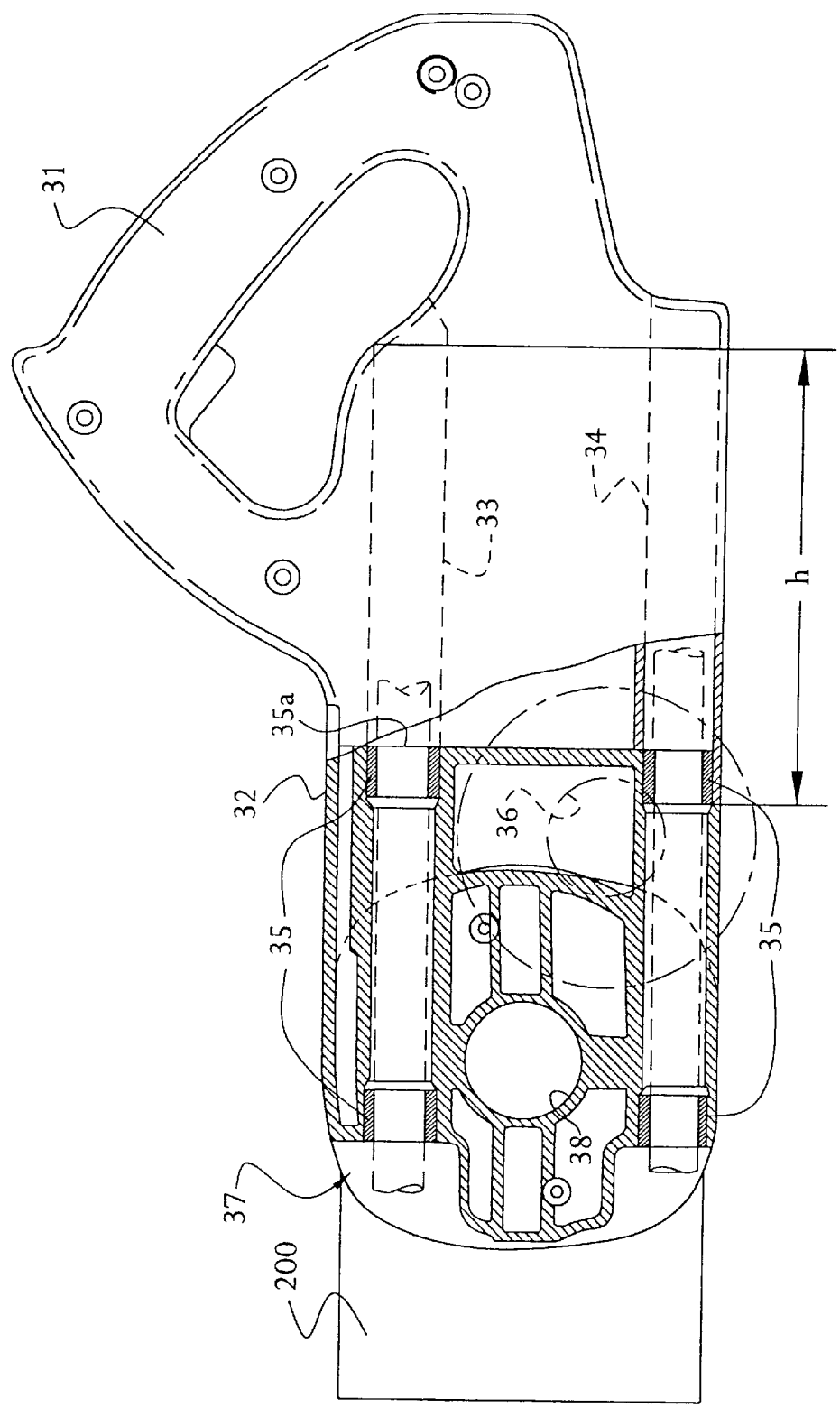
FIG. 9 is a partially sectioned view of a housing for saw assembly without the blade guard and the saw blade.

A third embodiment is shown in FIGS. 7–9. FIG. 7 shows a workpiece support table 1 which may be equipped with adjustable support legs 2. A round table 3 may be pivotably mounted to the workpiece support table 1 in an appropriately dimensioned opening or recess 4 between a bottom 1a of the workpiece support table and a stop ledge 5 extending transversely over the round table. The round table 2 may be provided integrally with a bracket arm 6, which during the pivoting of the round table 3, moves within a recess 8 bounded by a pair of mutually oblique lateral walls 7. The position of the bracket arm 6 may be immobilized by engaging a locking device 9 within suitable notches 10, whereby the position of the round table 3 is also locked in.

A support plate 110 may be fixedly connected with the round table 3. A pivot bearing 120 for a saw assembly 130 may be mounted on the support table 110, and is capable of executing cross-cut, miter and draw cuts as will be explained. For this purpose, a saw blade 160 (located behind an upper blade guard 140 and a lower blade guard 15) is immersed into an insertion slit 170 comprising two mutually aligned portions 170a and 170b. The portion 170a extends approximately from the center of the round table 3 to its periphery, and the portion 170b I disposed in the bracket arm 6.

A bearing yoke 240 is rotatably supported on the swivel axis 230 and comprises two sleeve-like bearing bodies 25 fro receiving the round rods 26. The bodies 25 may be mutually parallel and interconnected by means of transverse braces 27 and 28. The upper round rod 26 may extend through the body 25 and project therefrom to the rear. A tension spring 29 may be hooked into the end of the rod 26, the other end whereof may be fixedly connected with the bearing block 180 by means of a holding bolt 30. The spring 29 insures that the round rods 26 and the yoke 24 are always brought into the position indicated in FIG. 7, i.e., rotated counterclockwise about axle 230 in FIG. 8, wherein the rods 26 occupy their upper terminal position. The saw assembly 130, which moves freely on the rods 26, is normally held by the force of gravity in a left-hand terminal position wherein the saw housing (to be described below) abuts against the frontal sides 25a of the sleeve-like bearing bodies 25. In the position shown in FIG. 7, the saw assembly 13 is in its right-hand terminal position, in which it must be held by manual actuation with a handle 31.

It is seen in FIG. 9 that the saw housing 32, equipped with the manual handle 31, may comprise a pair of cylindrically-shaped longitudinal guide passages 33 and 34, the internal diameter whereof may be coordinated with the outer diameter of the round rods 26 to slidingly receive the latter. End sections of each of the longitudinal passages 33,34 may be provided with low friction guide bushings 35, abutting against the rods 26 and assuring an accurate guidance. The longitudinal passages 33, 34 may be long enough to assure that the round rods 26 remain within the passages 33, 34 over the entire draw length h. In a manner not shown in detail, the rods 26 may be equipped on their free ends with stops abutting against frontal side 35a of the guide bushings 35 and preventing the extraction of the guide rods 26 from the longitudinal passages 33, 34.

The guide bushings 35 may be each spaced laterally with respect to a bearing bore 36 for the saw blade 160 which is provided in the housing 32 and defines the axis of rotation of the blade. The bushings 35 may extend directly above and below a position of the collector and brush holder components of the drive motor. The motor may be bearingly supported within a housing section 37 laterally projecting from the housing 32. The motor output shaft may be disposed within a bore 38. This layout of the longitudinal passages 33, 34, which may also extend directly adjacent to the saw blade 160, yields an exact guidance of the saw housing 32. Cutting inaccuracies may be excluded almost entirely.

When using the saw, the workpiece to be processed is placed against fence 5. Subsequently the bearing block 21 of the pivot bearing 120 is set so that the saw blade 160 is either perpendicular to the surface of the workpiece support table 1 or at an angle to it. The miter angle may be adjusted by setting the position of the rod table 3 and subsequently processing may be initiated by a lowering of the saw assembly (accompanied by a rotation of the yoke 240 about the axle 230) by means of the handle 31. Following the immersion of the saw blade 160 into the slit 170, the entire saw assembly 130 may be displaced (to the left of FIG. 7) by means of the handle along the round rods 26, i.e., along the axis 220, so that a draw cut is possible. After cutting, the handle 31 is released. The spring 29 lifts the round rods 26 and the saw assembly upwards, into the position shown in FIG. 7. By its own weight, the saw assembly 13 slides into the left-hand position until it abuts against the frontal surfaces 25a of the sleeve-like bearing bodies 25.

As shown in FIGS. 7 and 9, the saw also has a battery 200 connected to the motor. The battery 200 may be mounted on housing 37, as shown in FIGS. 7 and 9, preferably in a manner that does not interfere with the chopping action of the saw unit 130. Persons skilled in the art will recognize, however, that battery 200 may also be mounted on the table 3, etc. Again, the battery 200 is preferably a rechargeable nicked cadmium (NiCd), nickel metal hydride (NiMH), lithium, or lead-acid battery. Such batteries can support the high-current, high-power requirements needed for a cordless chop saw. Preferably, such batteries have a voltage rating of at least 14 volts.

Persons skilled in the art may also recognize other alternatives to the means disclosed herein. However, all these additions and/or alterations are considered to be equivalents of the present invention.

I claim:

1. A chop saw comprising:
    a base;
    a saw unit having an electric motor, said saw unit being pivotably connected to said base and movable between a first lower position towards said base and a second upper position away from said base; and
    a battery having a battery housing, said battery housing being attachable to said saw unit and said battery being electrically connected to said motor.

2. The saw of claim 1, wherein said battery housing is attachable to a motor housing on said saw unit.

3. The saw of claim 1, wherein the saw unit includes a table and said saw unit is pivotally connected to the table.

4. The saw of claim 3, wherein the saw unit rotates about a bevel axis.

5. The saw of claim 4, wherein the table rotates about a first axis of rotation.

6. The saw of claim 5, wherein the bevel axis is substantially perpendicular to the first axis of rotation.

7. The saw of claim 1, wherein the saw unit rotates about a bevel axis.

8. The saw of claim 1, wherein the saw unit further comprises a support arm pivotally connected to the base, and at least one rod connected to the support arm.

9. The saw of claim 8, wherein the at least one rod is fixedly connected to the support arm.

10. The saw of claim 8, wherein the blade is connected relative to the at least one rod, so that the blade can linearly move relative to the support arm.

11. The saw of claim 8, wherein the motor is connected relative to the at least one rod, so that the motor can linearly move relative to the support arm.

12. The saw of claim 8, wherein the saw unit further comprises a second rod connected to the support arm.

13. The saw of claim 12, wherein the two rods are coplanar.

14. The saw of claim 12, wherein the two rods are disposed in a vertical plane.

15. The saw of claim 1, wherein the battery is rechargeable.

16. The saw of claim 1, wherein the battery has a battery chemistry selected from the group consisting of nickel cadmium, nickel metal hydride, lithium and lead-acid.

17. The saw of claim 1, wherein the battery has a voltage of at least 14 volts.

18. The saw of claim 1, wherein the saw unit is connected to the table via a pivot junction.

19. The saw of claim 8, wherein the saw unit comprises a handle for moving the saw unit between the first and second positions.

20. The saw of claim 9, wherein the battery is disposed between the handle and the pivot junction.

21. The saw of claim 9, wherein the battery is disposed near the handle.

* * * * *